United States Patent [19]

Walter

[11] Patent Number: 5,038,012
[45] Date of Patent: Aug. 6, 1991

[54] ELECTRICAL DISCHARGE PROCESS AND MACHINING APPARATUS

[75] Inventor: Herbert Walter, Fluorn-Winzeln, Fed. Rep. of Germany

[73] Assignee: Herbert Walter Werkzeung-Und Maschinenbau, Fluorn-Winzeln, Fed. Rep. of Germany

[21] Appl. No.: 395,455

[22] Filed: Aug. 18, 1989

[30] Foreign Application Priority Data

Aug. 30, 1988 [DE] Fed. Rep. of Germany ....... 3829363

[51] Int. Cl.$^5$ ............................................. B23H 1/04
[52] U.S. Cl. .............................. 219/69.15; 219/69.17
[58] Field of Search ................ 219/69.15, 69.17, 69.2, 219/69.11

[56] References Cited

U.S. PATENT DOCUMENTS

| | | | |
|---|---|---|---|
| 4,596,066 | 6/1986 | Inoue | 219/69.15 |
| 4,754,115 | 6/1988 | Rhoades | 219/69.2 |
| 4,764,653 | 8/1988 | Bühler | 219/69.15 |
| 4,859,824 | 8/1989 | Ukaji et al. | 219/69.15 |

*Primary Examiner*—Geoffrey S. Evans
*Attorney, Agent, or Firm*—Mason, Fenwick & Lawrence

[57] ABSTRACT

A method for electroerosive machining of metal workpieces and related apparatus. The erosion head of an electroerosive machining apparatus is moved with a blank clamped in it to a machining device for machining the blank with a machine tool held in the machining device, preferably a rotating milling tool the erosin head, and moves the blank for machining relative to machine tool as directed by a control computer. The machining device is located below the erosion head, with a vertical or horizontal axis of rotation, the electrode, following its manufacture, form the blank, is moved while still held by the erosion head to the electroerosive machining apparatus. Alternatively, an additional clamping device can be provided constructed like the erosion head for holding an electrode blank for machining by the machining device, while a workpiece is machined by electroerosion using an electrode held by the erosion head.

19 Claims, 12 Drawing Sheets

ELECTRICAL DISCHARGE PROCESS AND MACHINING APPARATUS

The invention relates to a method of electroerosive machining of a metal workpiece and to apparatus for performing this method.

In computer integrated manufacturing, new electrodes must automatically be supplied from a magazine to a spark erosion machine. In conventional fashion, the electrodes are manufactured as a rule on a separate milling machine and transported from there to a supply magazine on the erosion machine. New electrodes are taken from the magazine by the erosion machine as needed and used for electroerosive machining of metal workpieces.

A manipulator is required to transfer the electrodes from the milling machine to the erosion machine, resulting in high cost. Additional costs are generated by the milling machine used to manufacture the electrodes.

An object of the invention is to improve on a method according to the species for spark-erosion machining so that the manufacturing process is simplified and made less expensive. Another goal of the invention is to create a device for working this method.

In accordance with this invention, an erosion machine is used to make the electrodes. For this purpose, the erosion head is brought from the erosion position into a machining position and the blank for the electrode or the electrode to be finished is moved by means of the existing control system for the erosion head relative to a preferably stationary rotating tool for machining the blank or electrode; the tool is preferably a milling or grinding tool.

This makes an additional manipulator and independent machine for machining superfluous, resulting in considerable cost savings. Since the electrode remains clamped in the erosion head after being formed from the blank, errors caused by additional clamping are avoided.

In addition, the machining tools themselves, in other words, preferably a milling machine or grinder, can be changed automatically, and the erosion head can be fitted as well.

With the graphite electrodes usually used today, the manufacture of an electrode from a blank requires only a very short time so that the downtime of the erosion machine during electrode manufacture is insignificant.

However, if it is necessary to avoid downtime, the method is designed according to the invention such that while one erosion head is taking an electrode from a magazine in a manner known of itself and moving into an erosion position for machining the workpiece, at the same time new electrodes are being made and transferred to the magazine, using a clamping device in the form of an erosion head, cooperating with a preferably stationary device for machining. According to the invention, a blank or an electrode to be finished is moved by the clamping device from above along a tool, preferably a rotating milling machine or grinder.

In an advantageous improvement on the method, the electrode is machined to its final dimensions in two work steps. First, a simple shape, slightly oversize, is machined and then the erosion head and/or clamping device travels to a measuring gauge along with the electrode that has been roughly machined, to complete the shaping process. The deviation of the actual dimensions from the specified dimensions is taken care of in the second machining process to produce the final dimensions while controlling the erosion head and/or clamping device, with the electrode being manufactured with especially high accuracy. At predetermined time intervals and/or after reaching a certain erosion depth, or after a certain number of erosion processes, the erosion head can be moved again into a measuring position in order to check the dimensional stability of the electrode. Depending on the deviations of the actual dimensions from the specified dimensions, either electroerosive machining is continued, the electrode is shaped, or a new electrode is made. The differences between specified and actual dimensions which are measured are corrected during subsequent electroerosive machining. This procedure also produces higher accuracy in electroerosive machining, especially in automatic manufacture.

A device for working the method consists in an erosion head which can be moved, at least in the feed direction, toward the workpiece and vertically with respect to it, as well a device for machining, preferably a milling machine or grinder, whose tool has the machining side upward or horizontal. In the simplest case, a face mill or cylindrical milling cutter is used as the tool.

The movements of the erosion head in different directions can be controlled by a preferably program-controlled electronic control device. Guidance of the erosion head in the X direction is continued until the erosion head is moved from the erosion position into the machining position, in which the machining device is located.

In conventional milling or grinding machines, the workpiece is normally machined with the tool from above or from the side. Displacing the tool downward means that the electrode does not have to be re-clamped after manufacture or re-machined for electroerosive machining of the workpiece.

In one advantageous improvement, the machining device is designed to be continuously pivotable between a vertical and a horizontal position. If a tool changer is also provided, any tool change that may be necessary can be performed automatically.

In one alternative design, in addition to the erosion head, a clamping device which is designed like the erosion head and can be operated under control, is provided. This clamping device cooperates in the manner described with the machining device. For the erosion head and/or clamping device, common guidance in the X direction is provided. To receive and release blanks and electrodes, a magazine is located between the machining device and the erosion position. In this device, the downtimes of the erosion machine do not occur while the electrodes are being manufactured and/or finished. Nevertheless, no manipulator is required since the electrode need not be rotated through 180° after machining.

The invention will now be described in greater detail with reference to embodiments shown in the drawings.

BRIEF DESCRIPTION OF THE DRAWINGS

FIG. 9a is a cross section view taken on line 9a—9a of FIG. 8a;

DESCRIPTION OF THE PREFERRED EMBODIMENTS

Figure 1:
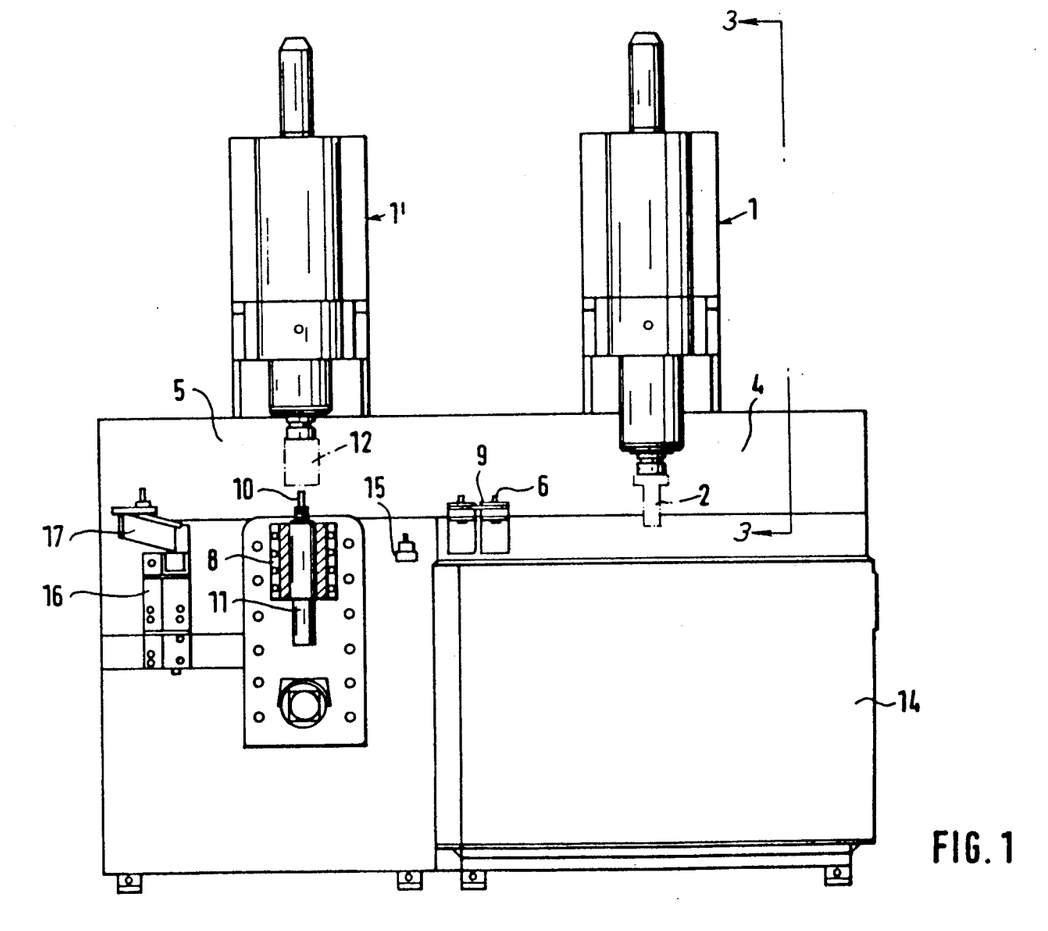
FIG. 1 is a schematic front view of a machining center according to the invention for electroerosive machining in a first embodiment with an erosion head, clamping device, and a milling and/or grinding device.
Figure 2:
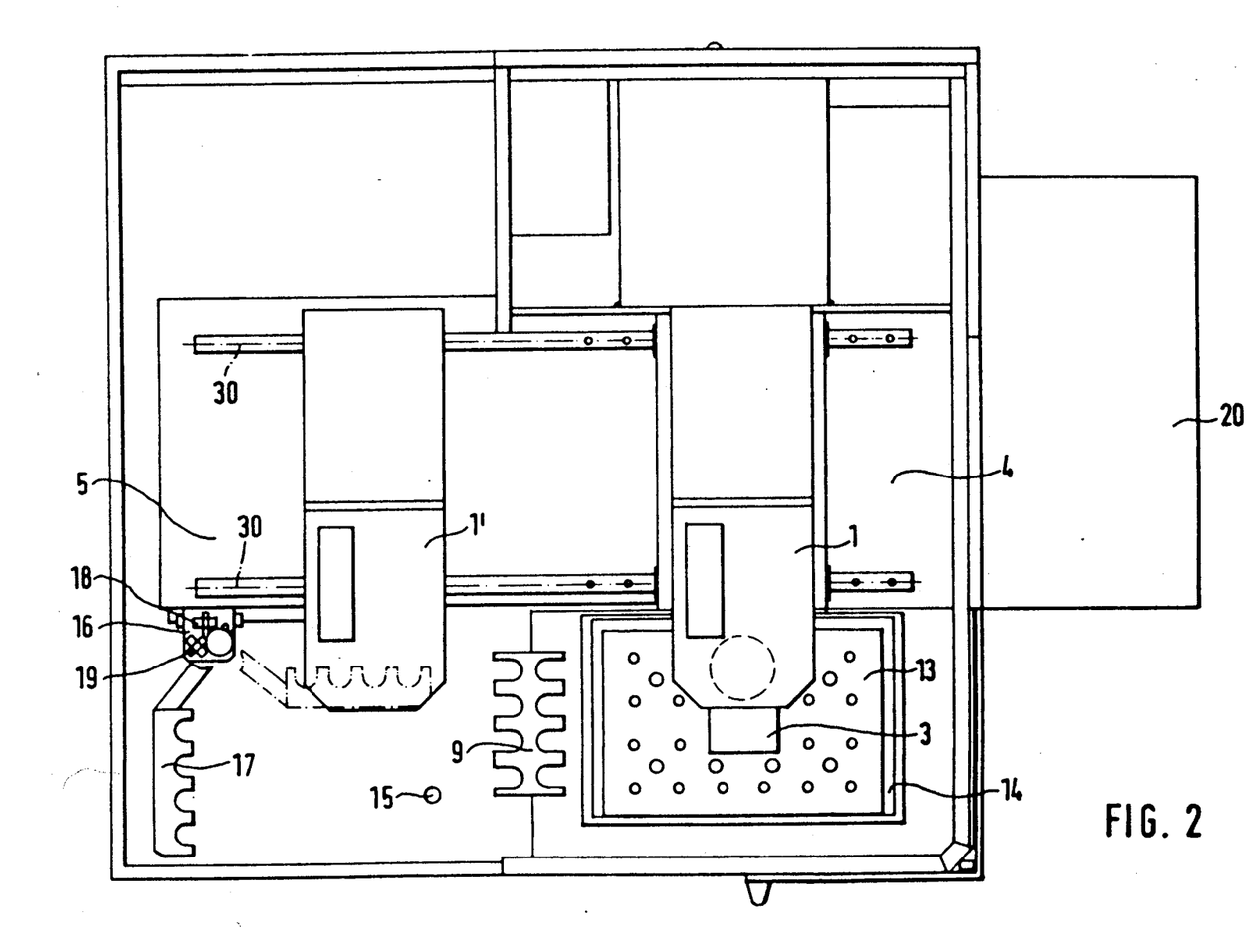
FIG. 2 is a schematic top view of a machining center according to FIG. 1.

According to FIGS. 1 and 2, a machining center for electroerosive machining is equipped with an erosion head 1 and a clamping device 1' in the form of an erosion head, which are movable on a common guide 30, X axis extending along an axis designated the term "X axis" will be understood to mean a horizontal direction of movement of an assembly that can move with guidance by a drive unit. The term "Y axis" means a horizontal axis perpendicular to the X axis and "Z axis" will be understood to be a vertical axis. The term "C axis" refers to a vertical axis of rotation of an assembly which has an integral drive the assembly about unit to drive the axis of rotation. As can be seen in greater detail in FIG. 3, erosion head 1 and clamping device 1' can also move along the X axis on guides 30, Y axis and along the 31 and along the Z axis on guides 32. In addition, erosion head 1 and clamping device 1 ' are each constructed to rotate around their own axes e.g. the axis of rotation 37 in FIG. 8.

Erosion head 1, which has an electrode 2 clamped in it, is shown in an erosion position 4 above an erosion bath 14. Horizontally spaced along the X axis, clamping device 1' is shown in a machining position 5, which can be used together with a machining device 8 to make electrodes 2.

Below erosion head 1, as shown in FIG. 2 is an erosion bath 14 with a clamping plate 13 on which a workpiece 3 to be machined is clamped. Adjacent to erosion bath 14 is a magazine 9 for receiving electrode blanks 12 and electrodes 2. Electrode blanks 12 and electrodes 2 can be coupled by a coaxial coupling 6 at their upper ends to erosion head 1 and/or clamping device 1'. Next to magazine 9 there is also an automatic measuring device 15 with a measuring sensor, whose output signals are fed to an electronic control device 20 for processing.

To machine workpiece 3, erosion head 1 initially travels to magazine 9, where it couples by means of coupling 6 to a prefabricated electrode 2, and then moves along guide 30 laterally once more into erosion position 4, in which workpiece 3 can be machined after electrode 2 has been dipped in erosion bath 14.

Below clamping device 1' there is a machining device 8 which is not shown in FIG. 2 for the sake of clarity. At machining device 8, which is shown individually in FIGS. 8, 8a, and 9, 9a, a tool spindle drive 11 is provided to drive a machine tool 10, which can be a milling machine or grinder, and has its machining side upward.

Figure 8:
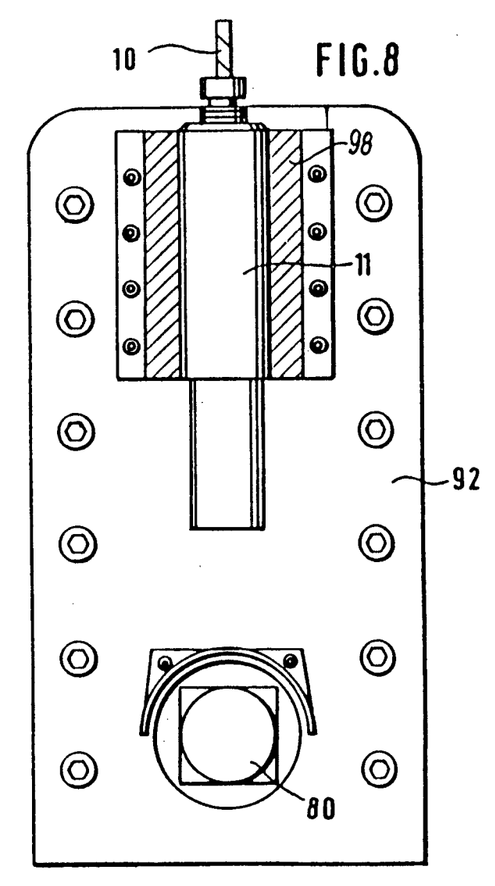
FIG. 8 is an enlarged front view of the machining device shown in FIG. 1 and FIG. 2a with a milling tool in place.

Machining device 8 is pivotable between the vertical position shown and two horizontal position through a total of 180°. Alternatively, a second machining device with a horizontal axis of rotation may likewise be provided.

In order to permit an automatic change of machine tool 10, a tool changer 16 is additionally provided to receive machine tools 10 next to clamping device 1'. Tool changer 16 has a swivel arm 17 with four tool storage positions, which can be swiveled to change tools between the extended position and the position indicated by the dashed lines in FIG. 2. The structure and function of tool changer 16 are shown in greater detail in FIGS. 10 and 11.

To make an electrode 2, clamping device 1' moves to magazine 9 and removes therefrom a blank 12, coupled to coupling 6. Clamping device 1' then moves to the machining position 5 of machining device 8. According to a program set by electronic control device 20, clamping device 1' and blank 12 now move along rotating machine tool 10 in order first to mill a simple electrode shape which is slightly oversize. Then clamping device 1' can travel in the X, Y, and Z directions and be rotated around its lengthwise axis if needed. If necessary, machining device 8 can also be pivoted through any angle. Following preliminary milling, clamping device 1' moves to measuring device 15, by means of which the actual dimensions of the milled blank are measured. The deviations of the actual dimensions from the specified dimensions stored in the program of electronic control device 20 are used for corrections in a second milling process in which the electrode is milled to its final dimensions. This produces especially high precision in making electrodes. The dimensions of the pre-milled electrode can be accomplished in simple fashion because of the simple shape involved; measurement of complicated shapes after making the electrode is not required. The finished electrodes are stored in magazine 9 from which erosion head 1 removes electrodes for electroerosive machining of workpieces.

Figure 2A:
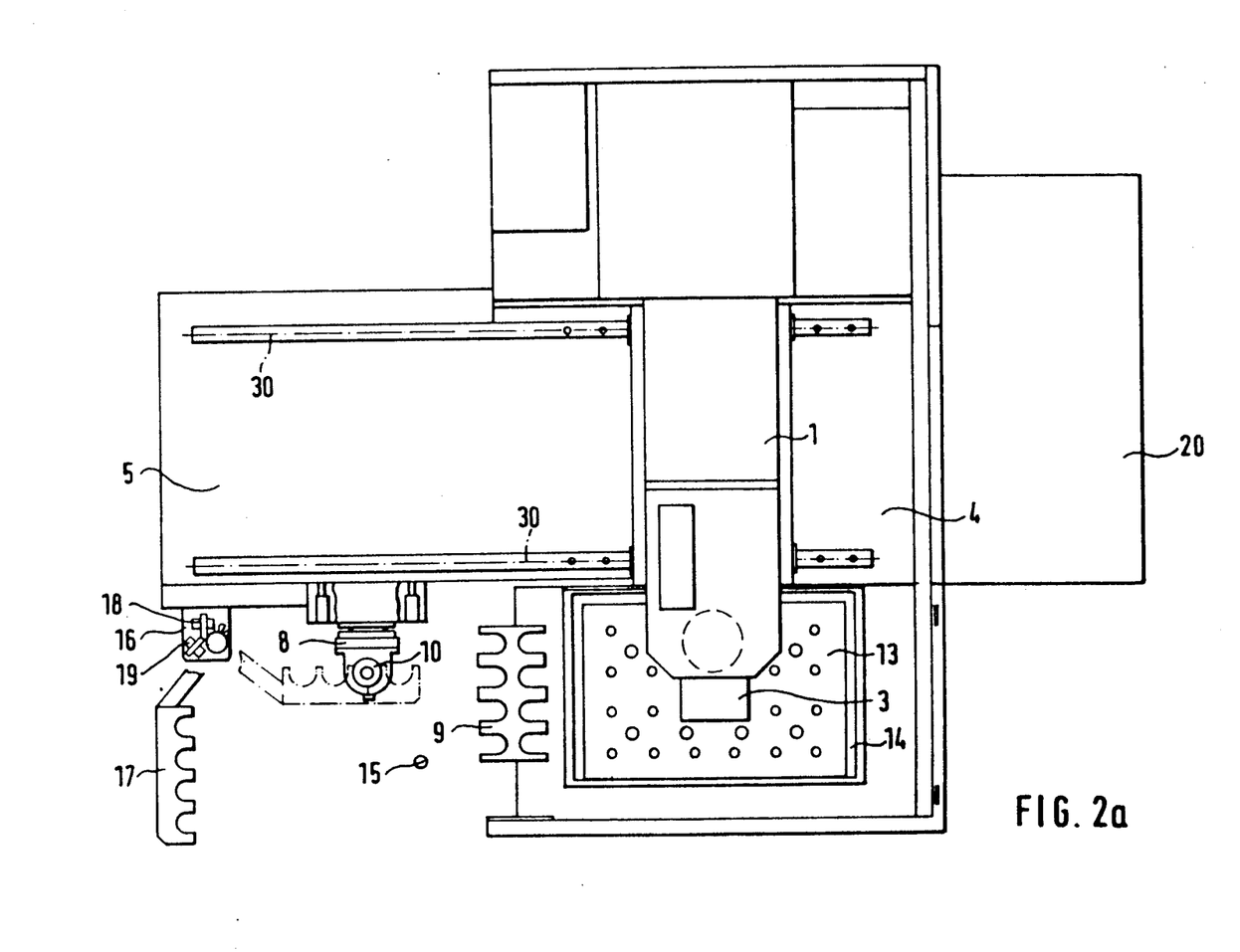
FIG. 2a is a schematic top view of a second embodiment of a machining center with an erosion head and a milling and/or grinding device.
Figure 2B:
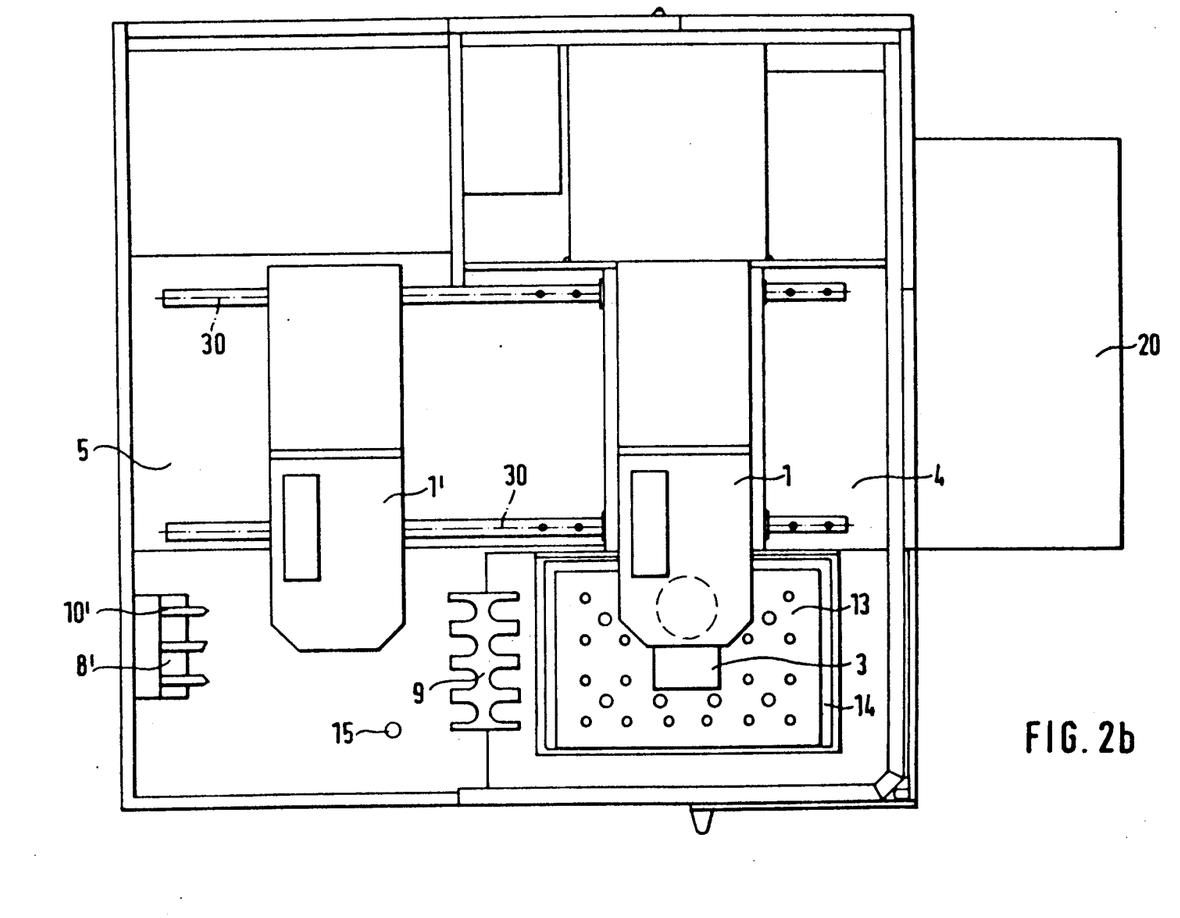
FIG. 2b is a schematic top view of a third embodiment of a machining center with an erosion head, a clamping device, and a rotating device.

Although it is advantageous for reaching a throughput which is as high as possible, to provide the machining device according to FIG. 1 as a milling machine or grinder, machining device 8' according to FIG. 2b can also be made as a simple holder to receive rotary tools 10'. In this case, the blank is rotated about the C axis of clamping device 1'. Machining device 8' can also be made linearly movable or pivotable for improved handling, if desired.

In many cases, a sufficiently high throughput from the machining center can be achieved even without the additional clamping device 1', using only erosion head 1 as shown in FIG. 2a. In this case, erosion head 1 is used both for erosion and for manufacturing or finishing of electrodes in conjunction with the machining device. In this especially cost-effective design, a grinder or milling machine is provided as a machining device 8, preferably according to FIG. 2a, in order to shorten the downtimes during manufacture and/or finishing of an electrode. Following manufacture of an electrode, the latter can be used immediately without re-clamping for electroerosive machining of the workpiece. In this way, extremely high precision can be achieved in erosion machining.

If desired, at preset time intervals or after reaching a predetermined erosion depth, or after a predetermined number of erosion processes, erosion head 1 can be moved from erosion position 4 to measuring device 15 in order to measure the actual dimensions of the electrode. If the deviations in the actual dimensions with respect to the specified dimensions are below a predetermined value X1, machining of workpiece 3 continues. If this difference between the specified and actual values, however, exceeds the value X1, but is still below a predetermined value X2, erosion head 1 moves to machining position 5 in which electrode 2 is finished and/or the electrode is placed in magazine 9 for machining. The differences between the specified and actual electrode dimensions are considered in both cases as corrections in electroerosive machining. However, if the differences between the specified and actual dimensions of the electrodes are above a value X2, a new electrode is manufactured and/or a new electrode is taken from the magazine before machining of workpiece 3 continues.

Figure 3:
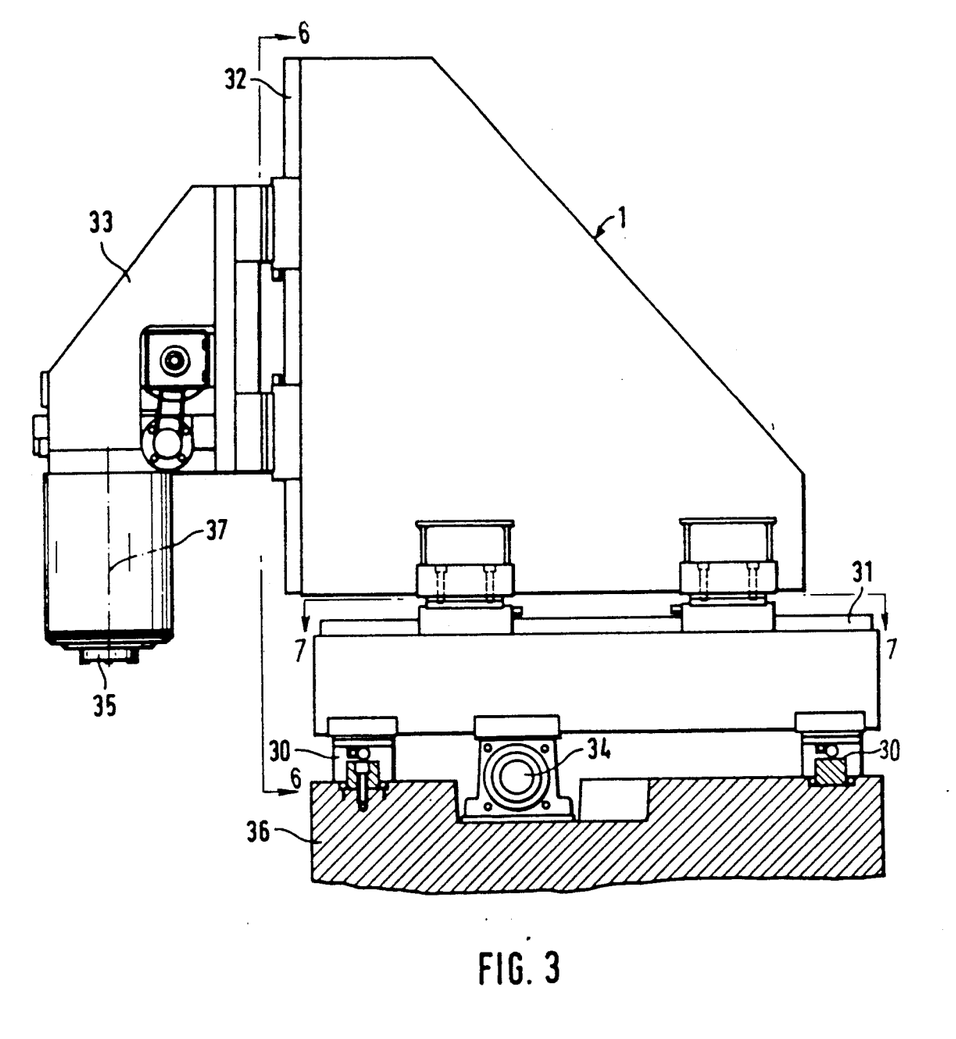
FIG. 3 is a simplified partially cut-away side view of an erosion head taken on the line 3—3 of FIG. 1.

By means of this automatic machining or replacement of the electrodes, the highest possible accuracy can be achieved in automatic manufacture over long periods of time without intervention by operating personnel. The arrangement of the axis of rotation and the three linear axes of movement of erosion head 1 are shown in FIG. 3. Guides for movement along all three linear axes, X axis, Y, and Z, are structured in the same way and can be traversed by means of a spindle drive. First of all, X axis guidance is provided by guides 30 located on machine frame 36, and a spindle drive 34 provided for propulsion. Guides 31 are provided, at 90° to guides 30, and guides 32 are vertical at 90° 31. The two guides 32 are at the front of the machining center and are rails, as are guides 30 and 31. The 33 is located for movement along guides 32, and an electrode and/or blank can automatically be clamped in its electrode holder 35.

Figure 4:
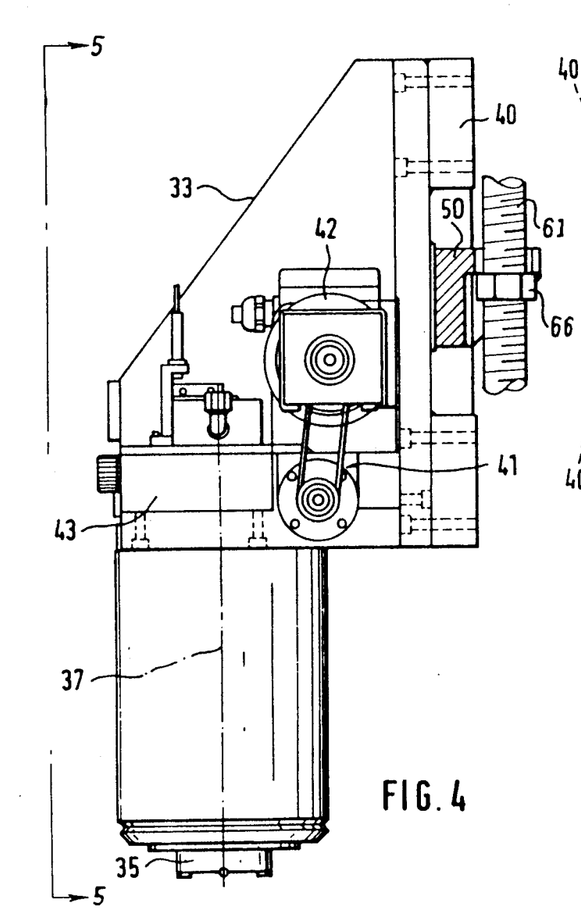
FIG. 4 is an enlarged view of a portion of FIG. 3 with parts in section.
Figure 5:
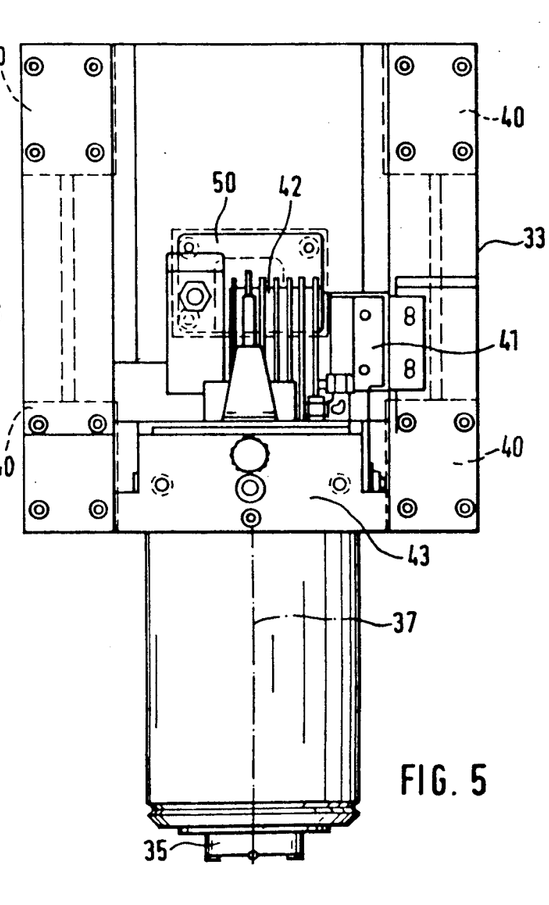
FIG. 5 is an elevational view taken on the line 5—5 of FIG. 5.
Figure 6:
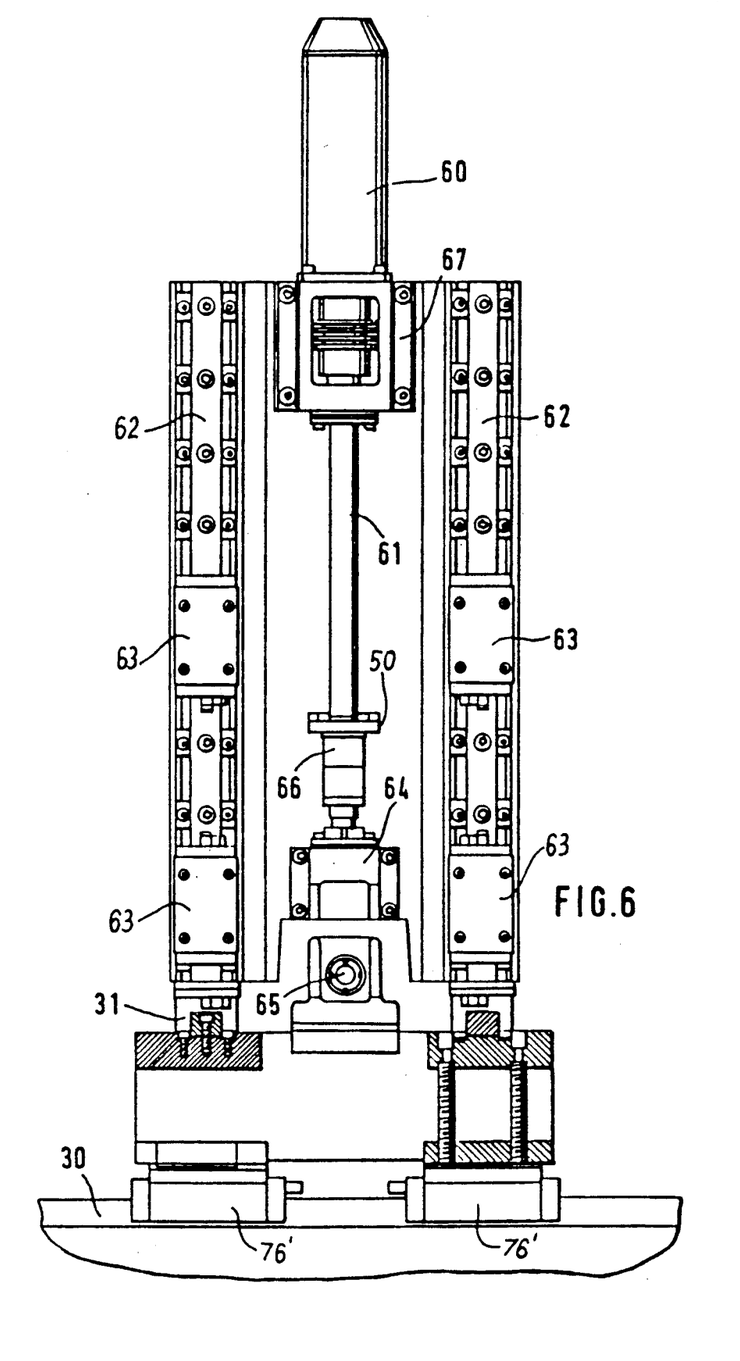
FIG. 6 is a view taken on line 6—6 of FIG. 3.

The construction of carrier 33 is shown in FIGS. 4 and 5. The carrier 33 is supported on four supporting plates 40 on guide shoes 63, which are guided according to FIG. 6 on the two vertical parallel guide rails 62. To move the carrier 33 vertically it is provided with a spindle nut receptacle 55; a spindle nut 66 on spindle 61 shown in FIG. 6 is fastened in the spindle nut receptacle 50. To rotary movement around rotational axis 37, an electric motor 42 is provided, connected by a belt drive 41 to a worm drive 43 which drives electrode holder 35. If the erosion head 1 together with a machining device 8', operating as a rotating device is used to make electrodes and/or machine them, faster rotation of electrode holder 35 around rotational axis 37 is desirable. In this case, instead of driving through belt drive 41 and worm drive 43, an electric motor is located directly in the extension of rotational axis 37, permitting rotational speeds of up to 3000 rpm and, by means of electronic control, also permitting positioning of the electrodes and/or blank at any angular position.

There are shown in FIG. 6 two parallel guide rails 62, between which a spindle drive is located. Two guide shoes 63 are guided by roller bearings and are movable lengthwise on guide rails 62. Supporting plates 40 of carrier 33 are bolted to these guide shoes 63. At the upper end of the carrier 33 an electric motor 60 is provided for driving spindle 61 (for the sake of clarity, this electric motor 60 is not shown in FIG. 3). Spindle 61, clamped with zero play between bearings 64 and 67, drives spindle nut 66, which is mounted in spindle nut receptacle 50 of carrier 33. Guides 31 and a parallel spindle 65 for effecting movement along the Y axis are shown in FIG. 6.

Figure 7:
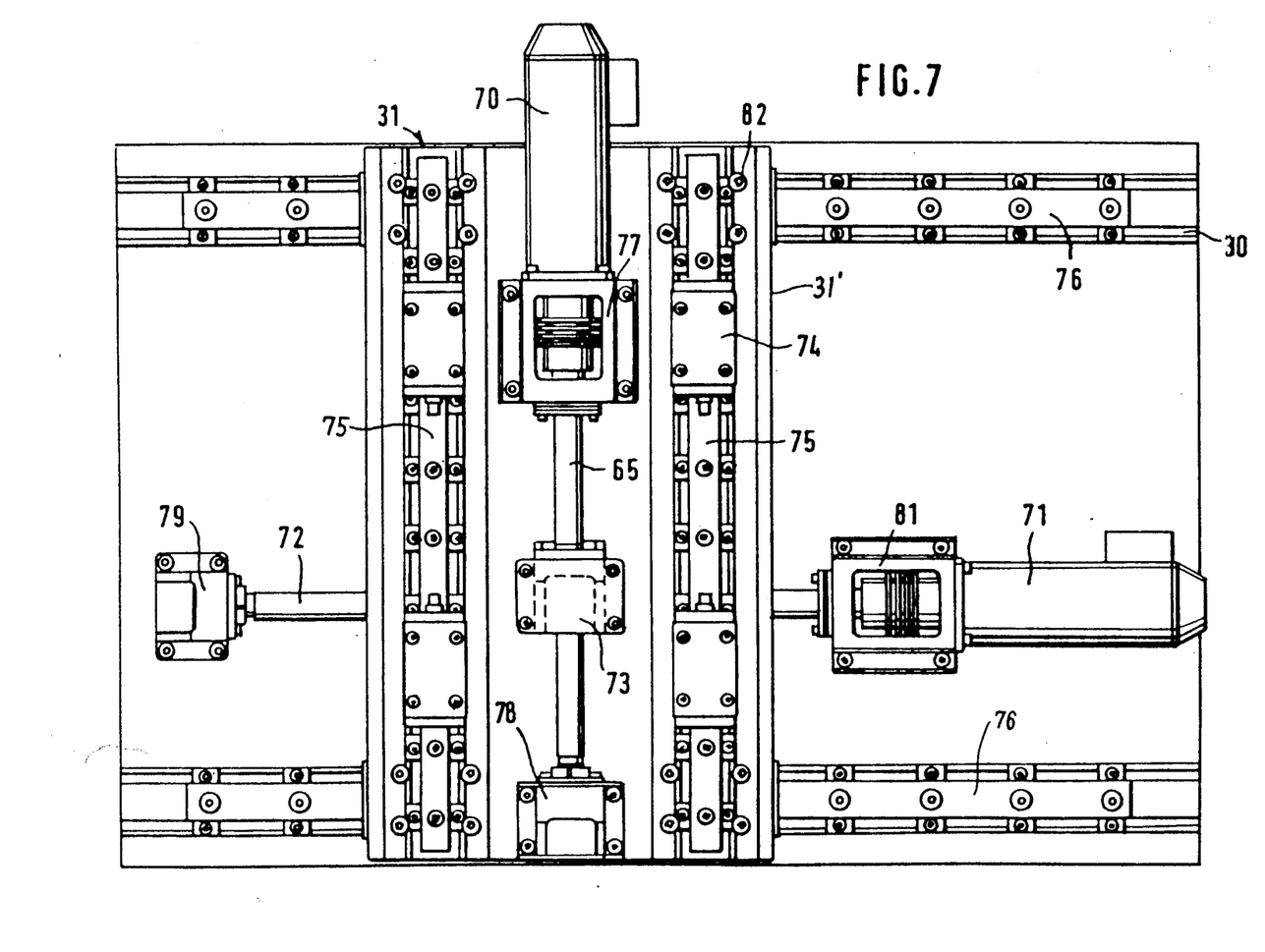
FIG. 7 is a view taken on line 7—7 of FIG. 3.

Shown in FIG. 7, X are two parallel guide rails 76 of guides 30 on each of which two guide shoes 76 (FIG. 6) with roller bearings are guided in a lengthwise displaceable manner. Truck 31' is mounted on the four guide shoes 76'. In FIG. 7, the guide shoes (not shown) are connected to truck 31' by screws 82. In the manner described above, an electric motor 71 is provided truck 31, along the X axis, said motor driving spindle 72 mounted at either end between bearings 79 and 81. Spindle 72 drives a spindle nut on the underside of truck 31' in the manner described above.

The erosion head 1 is guided for movement along the Y axis by guides 31 which comprise two parallel guide rails 75. Two guide shoes 74 are guided on each guide rail 75. In the middle, between the two guide rails 75, is electric motor 70 for driving spindle 65, which is mounted with zero play between the two bearings 77 and 78. In the middle of spindle 65, there is a spindle housing 73, in which a spindle nut (not shown) is mounted; spindle housing 73 is connected to erosion head 1 by screws.

Clamping device 1' is constructed supported and moved in the same way as erosion head 1, and is also controlled as it moves. Only structure required for erosion, such as means to supply erosion fluid, are not shown on the drawings.

Figure 9:
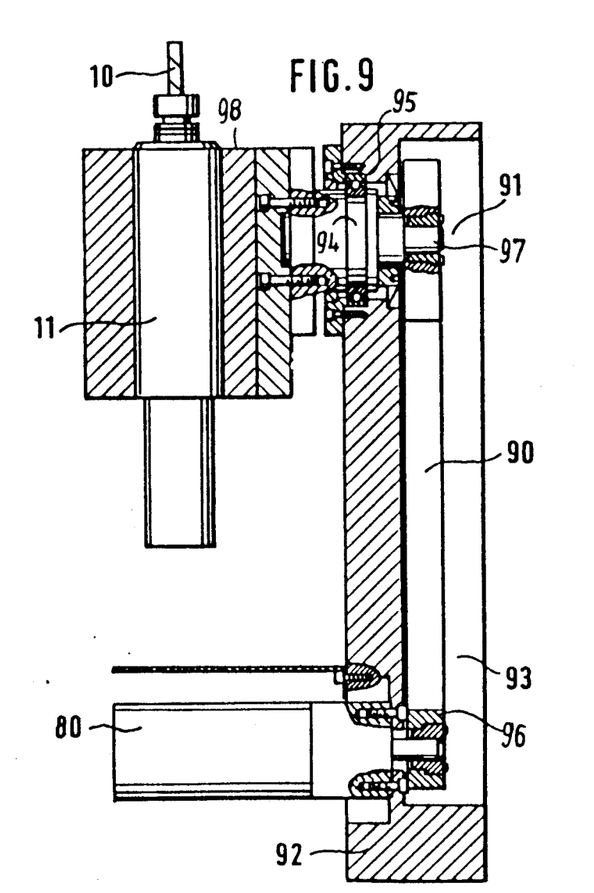
FIG. 9 is a cross section view taken on line 9—9 of FIG. 8.

A preferred embodiment of machining device 8 is shown in FIGS. 8 and 9. At the lower end of a base 92 an electric motor 80 is connected by a flange, with its axis horizontal. Motor 80 has a drive pinion projects into a cavity 93 on the back of base 92 and is which protected by on the surrounding parts of base 92.

On the upper end of base 92, a shaft 94 is supported by bearing 95, shaft 94 having a pivot axis 91 parallel to electric motor 80. The drive pinion 96 of electric motor 80, which is preferably an electronically controlled stepping motor, transfers its rotary motion through a toothed belt drive 90 to pinion 97 on shaft 94. On shaft 94 a tool spindle drive 11 is mounted crosswise with respect to the pivot axis 91 by a connector 98. A machining tool 10 in the form of a milling head projects upwardly from tool spindle drive 11. Tool spindle drive 11 can be pivoted from its basic position in which it has a vertical axis of rotation by rotating pivot shaft 94 about axis 91 by means of toothed belt drive 90 in either direction by 90° to the horizontal, in other words, through 180°. With appropriate control for electric motor 80, the rotational axis of tool spindle drive 11 can thus be positioned at any angle. Due to movement along the X axis, Y axis, Z axis, and about axis 37, numerous electrode shapes can be made by five-axis milling. Preferably a high speed spindle is provided as the tool spindle drive 11 so that the electrode blank can be machined using high-speed milling and/or grinding at rpm's on the order of up to 50,000 or more.

Figure 8A:
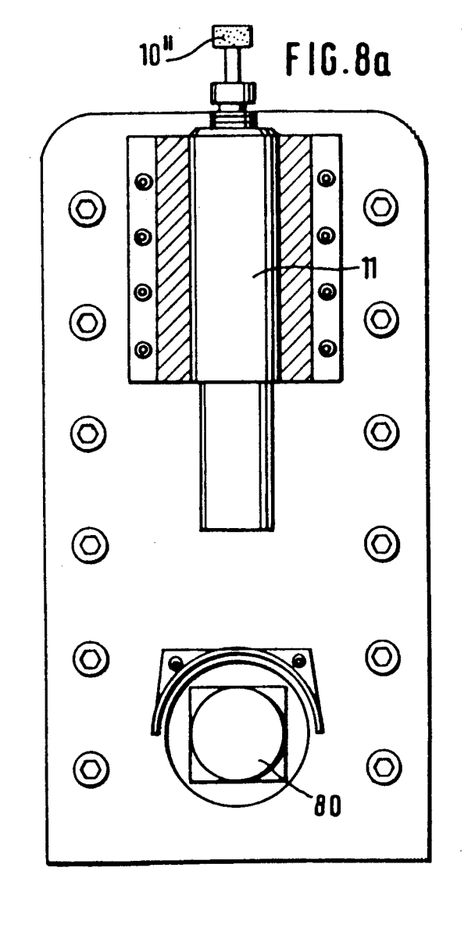
FIG. 8a is an enlarged front view of the machining device according to FIG. 1 with a grinding tool in place.
Figure 9A:
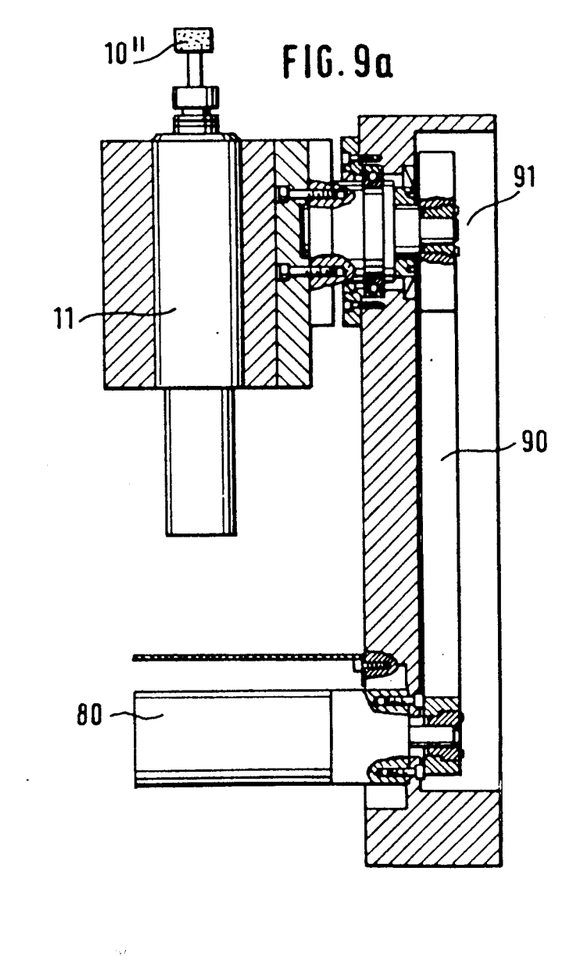

FIGS. 8a and 9a show an identical machining device 8, in which a grinder 10″ is used instead of milling head 10.

In order to permit automatic changing of machining tools 10 and 10″, in FIG. 1 there is shown in addition to machining device 8, tool changer 16 with a pivot arm 17. The tool changer, shown enlarged in FIGS. 10 and 11, has on its pivot arm 17 four tool storage positions 117 located in series, for receiving clamping heads 100 in which machining tools 10 and 10″ are clamped. Pivot arm 17 is mounted at the upper end of a shaft 112 mounted vertically, which is mounted in two bearings 115 and 116. In order to pivot shaft 112, a pneumatic rotation cylinder 114 is connected to its lower end. The angular position of pivot arm 17 is limited by two end stops 111, 113. Two end switches 18 and 19, as shown in FIGS. 2 and 2a, serve to shut off rotary cylinder 114.

Figure 10:
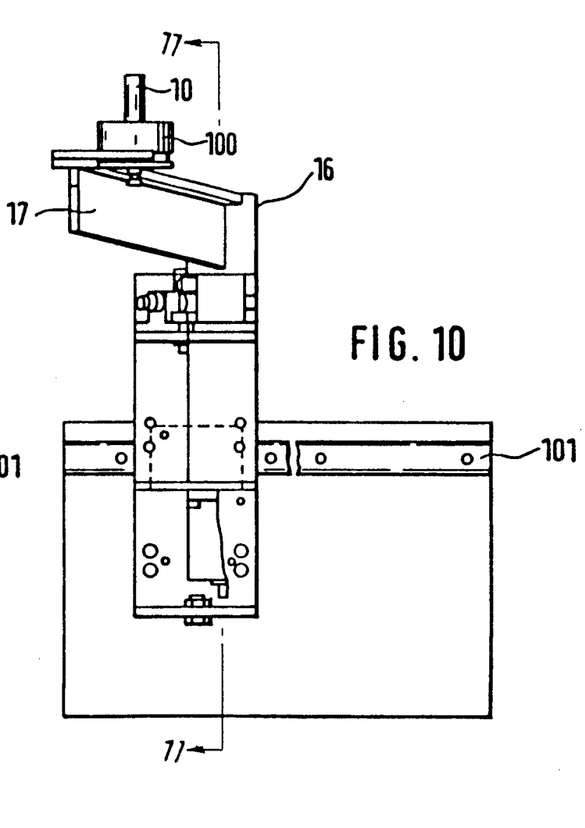
FIG. 10 is a partial perspective front view of the tool changer according to FIGS. 1, 2, and 2a on an enlarged scale.
Figure 11:
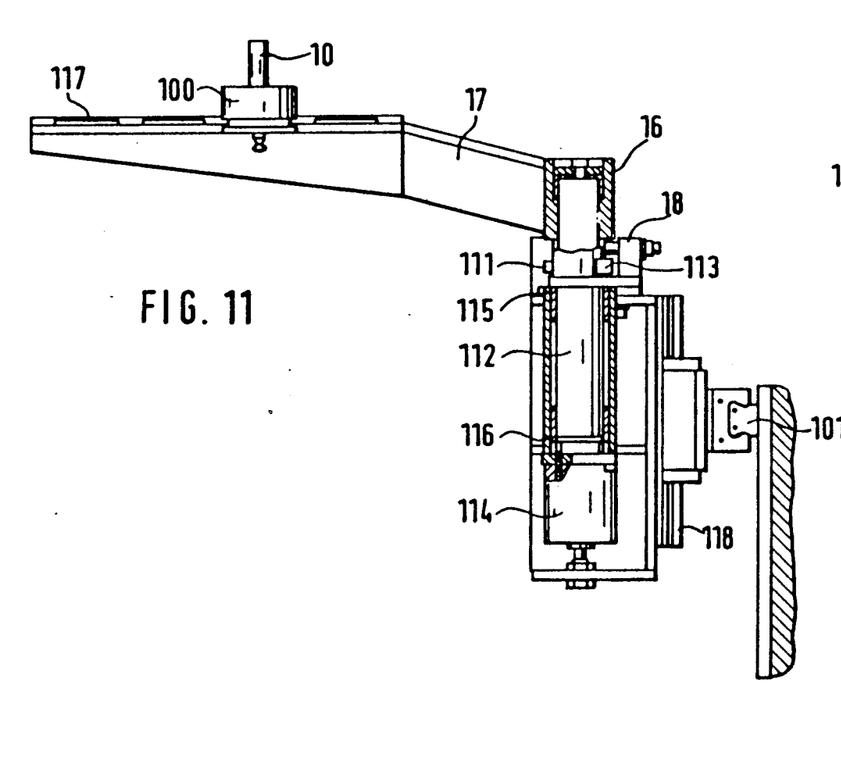
FIG. 11 is a view taken on line 11—11 of FIG. 10.
Figure 12:
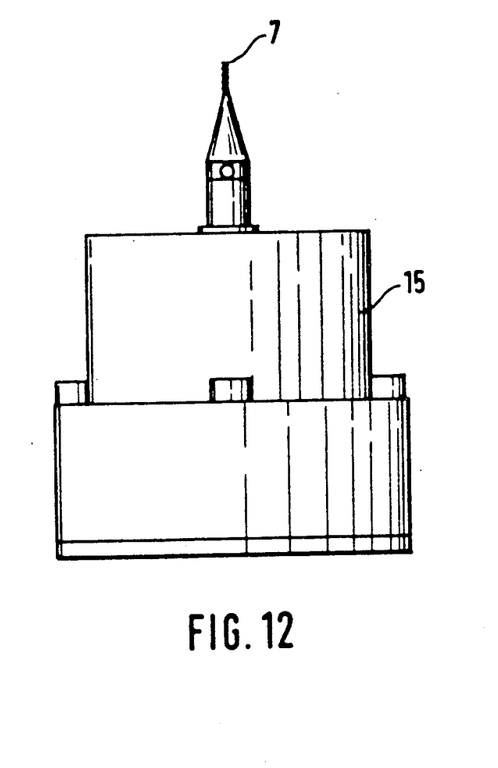
FIG. 12 is an enlarged front view of the measuring device shown in FIGS. 1, 2, 2a, and 2b.

The entire unit can be moved horizontally guided by a first linear guidance system 101 and vertically guided by a second linear guidance system 118, comprising an integrated drive.

If a used machining tool 10 or 10″ is to be changed, the tool changer 16 initially travels with one empty tool storage position 117 to machining device 8 and lowers pivot arm 17.

After receiving the clamping head with the used machining tool, the tool changer again moves upward and positions a new clamping head 100 with a new machining tool 10 and/or 10″ above machining device 8. After pivot arm 17 is lowered, clamping head 100 can automatically be coupled to machining device 8.

I claim:

1. A method for electroerosive machining of metal workpieces comprising:
   (a) providing a magazine for holding a plurality of electrode blanks;
   (b) removing a blank from said magazine by an erosion head;
   (c) positioning said erosion head having said electrode blank mounted therein above a machining tool;
   (d) machining said electrode blank by said machining tool to provide an electrode;
   (e) moving said erosion head with said electrode to an operative position relative to an electroerosive machining apparatus;
   (f) electroerosively machining a metal workpiece in said electroerosive machining apparatus utilizing said electrode; and
   (g) removing the electroerosively machined workpiece from said electroerosive machining apparatus.

2. The method of claim 1, wherein said electrode is provided with a holder, and further comprising engaging and holding said holder of said electrode blank by said erosion head.

3. The method of claim 1, wherein said electrode blank has a holder attached thereto, and further comprising engaging said holder with said erosion head.

4. A method according to claim 1, and further comprising stopping said machining when said electrode blank is above one or more preselected dimensions, measuring said electrode blank after said initial machining thereof, and further machining said electrode blank to a finished product in accordance with the deviation between preselected dimensional values for the finished electrode and the actual values as measured after said initial machining step.

5. A method according to claim 1, wherein the erosion head is caused to remove the electrode from the electroerosive machining apparatus (a) at a predetermined time interval, or (b) after reaching a predetermined erosion depth, or (c) after a predetermined number of successive electroerosion processing steps,
   thereafter measuring the deviations of the actual dimensions of said electrode from predetermined dimensions,
   determining if the differences between specified and actual values of said electrode which have been measured are below a predetermined value, and if so, effecting further electroerosive machining of said workpiece blank with said electrode,
   and wherein if the difference between the measured values and the specified values of said electrode are greater than said first mentioned preset value, but less than a second preset value, causing the erosion head to move the electrode either to (a) further machining said electrode by said machining tool, or (b) placing said electrode in said magazine and thereafter removing said electrode from said magazine with said clamping device, moving said electrode to said machining tool, and further machining said electrode by said machining tool while held by said clamping device, and
   if the differences between the preselected and the actual values measured during the above noted measurement of said workpiece blank exceed the second mentioned predetermined value, removing the electrode from the erosion head.

6. The method of claim 1, wherein the machining tool is a milling tool.

7. The method of claim 1, wherein the machining tool is a grinding tool.

8. The method of claim 1, wherein the machining tool is from the group comprising a milling tool or a grinding tool.

9. The method of claim 1, wherein the machining tool is both a milling tool and a grinding tool.

10. Apparatus for electroerosive machining of metal workpieces comprising:
    (a) an erosion head for holding an electrode,
    (b) electroerosive machining apparatus comprising means for holding a metal workpiece,
    (c) a machining apparatus adjacent said electroerosive machining apparatus, said machining apparatus comprising a tool spindle drive for holding a rotating machining tool,
    (d) means for supporting said tool spindle drive for pivotable adjustment over substantially 180°, between a first horizontal position and a second horizontal position, and including a vertical position in which a rotating machining tool supported by said tool spindle drive extends substantially vertically,
    (e) means for moving said erosion head to and from a metal workpiece along a first axis,
    (f) means for moving said erosion head along a second axis transverse to said first axis between a position in which an electrode carried thereby is in operative position relative to a metal workpiece in said electroerosive machining apparatus and an operative position relative to said machining tool of said machining apparatus, and
    (g) electronic control means for controlling the movement of said erosion head along said paths.

11. Apparatus for electroerosive machining of metal workpieces comprising:

(a) an erosion head for holding an electrode and comprising means for moving an electrode held thereby substantially vertically, (b) electroerosive machining apparatus below said erosion head, said electroerosive machining apparatus comprising means for holding a metal workpiece, (c) a machining apparatus laterally of said electroerosive machining apparatus comprising a tool spindle drive for holding a rotating machining tool, (d) means for supporting said tool spindle drive for pivotable adjustment over substantially 180°, between a first horizontal position and a second horizontal position, and including a vertical position in which a rotating machining tool supported by said tool spindle drive extends substantially vertically, (e) a clamping device for holding an electrode blank, said clamping device being at a level above said machining apparatus and comprising means for moving said electrode blank substantially vertically, (f) a magazine for holding electrodes and electrode blanks between said electroerosive machining apparatus and said machining device, (g) means for moving said erosion head along a horizontal path laterally between a position in which an electrode held thereby is in operative position relative to a metal workpiece in said electroerosive machining apparatus and said magazine, (h) means for moving said clamping device laterally between a position in which an electrode blank held thereby may be machined by said machining device and said magazine, and (i) electronic control means for controlling the movement of said erosion head and of said clamping device to effect removal of an electrode blank from said magazine by said clamping device, the machining thereof by said machining apparatus, and the placement of said machined electrode in said magazine by said clamping device, and the removal of an electrode from said magazine by said erosion head and the electroerosive machining of said workpiece by said electrode.

12. The apparatus in accordance with claim 10 or claim 11, and further comprising means for measuring a selected dimension or dimensions of an electrode blank held by said clamping device and an electrode held by said erosion head.

13. The apparatus in accordance with claim 10 or claim 11, and further comprising means for automatically changing machine tools in said machining device.

14. The apparatus in accordance with claim 10 or claim 11, and further comprising means for supporting said machining device in any of a plurality of selected positions.

15. The apparatus in accordance with claim 14, further comprising means for rotating at least one of said blanks and said electrode on its longitudinal axis.

16. The apparatus in accordance with claim 11, further comprising means for rotating at least one of said blanks and said electrode on its longitudinal axis.

17. Apparatus for electroerosive machining of metal workpieces comprising:

(a) an erosion head for holding an electrode and comprising means for holding and rotating an electrode having a longitudinal axis about said axis and for moving an electrode held thereby substantially vertically, (b) electroerosive machining apparatus below said erosion head, said electroerosive machining apparatus comprising means for holding a metal workpiece, (c) a machining apparatus laterally of said electroerosive machining apparatus comprising a machining tool, (d) a clamping device for holding an electrode blank, said clamping device being at a level above said machining apparatus and comprising means for moving said electrode blank substantially vertically, (e) a magazine for holding electrodes and electrode blanks between said electroerosive machining apparatus and said machining device, (f) means for moving said erosion head along a horizontal path laterally between a position in which an electrode held thereby is in operative position relative to a metal workpiece in said electroerosive machining apparatus and said magazine, (g) means for moving said erosion head in a horizontal path substantially perpendicular to said first mentioned horizontal path, (h) means for moving said clamping device laterally between a position in which an electrode blank held thereby may be machined by said machining device and said magazine, and (i) electronic control means for controlling the movement of said erosion head and of said clamping device to effect removal of an electrode blank from said magazine by said clamping device, the machining thereof by said machining apparatus, and the placement of said machined electrode in said magazine by said clamping device, and the removal of an electrode from said magazine by said erosion head and the electroerosive machining of said workpiece by said electrode.

18. A method for electroerosive machining of metal workpieces comprising:

(A) positioning an erosion head having an electrode blank mounted therein above a machining tool;

(B) machining said electrode blank by said machining tool to provide an electrode;

(C) moving said erosion head with said electrode to an operative position relative to an electroerosive machining apparatus;

(D) electroerosively machining a metal workpiece in said electroerosive machining apparatus utilizing said electrode;

(E) removing the electroerosively machined workpiece from said electroerosive machining apparatus;

(F) causing the erosion head to remove the electrode from the electroerosive machining apparatus:
  (a) at a predetermined interval, or
  (b) after reaching a predetermined erosion depth, or
  (c) after a predetermined number of successive electroerosion processing steps;

(G) thereafter measuring the deviations of the actual dimensions of said electrode from predetermined dimensions;

(H) determining if the differences between specified and actual values of said electrode which have been measured are below a predetermined value, and if so, effecting further electroerosive machining of said workpiece blank with said electrode;

(I) and wherein if the difference between the measured values and the specified values of said electrode are greater than said first mentioned preset value, but less than a second preset value, causing the erosion head to move the electrode either to:
  (a) further machining said electrode by said machining tool, or
  (b) placing said electrode in said magazine; and
(J) thereafter removing said electrode from said magazine with said clamping device, moving said electrode to said machining tool, and further machining said electrode by said machining tool while held by said clamping device; and
(K) if the differences between the preselected and the actual values measured during the above noted measurement of said workpiece blank exceed the second mentioned predetermined value, removing the electrode from the erosion head.

19. A method of electroerosive machining of metal workpieces comprising:
(A) providing a movable erosion head, a moving clamping device, a magazine for holding a plurality of electrode blanks, a machining tool, and an electroerosive machining apparatus having a workpiece therein;
(B) causing said clamping device to remove an electrode blank from said magazine;
(C) causing said clamping device to move said electrode blank into position above a machining tool;
(D) machining said electrode blank by manipulating said clamping device to cause said electrode blank to be engaged by said machining tool to produce an electrode;
(E) causing said clamping device to place the machined electrode in said magazine;
(F) causing said erosion head to remove an electrode which has been machined by said machining tool from said magazine;
(G) causing said erosion head to move said removed electrode to said electroerosive machining apparatus;
(H) electroerosively machining said workpiece with said electrode;
(I) causing said erosion head to remove the electrode from the electroerosive machining apparatus:
  (a) at a predetermined time interval, or
  (b) after reaching a predetermined erosion depth, or
  (c) after a predetermined number of successive electroerosion processing steps;
(J) thereafter measuring the deviations of the actual dimensions of said electrode from predetermined dimensions;
(K) determining if the differences between specified and actual values of said electrode which have been measured are below a predetermined value, and if so, effecting further electroerosive machining of said workpiece blank with said electrode;
(L) and wherein if the difference between the measured values and the specified values of said electrode are greater than said first mentioned preset value, but less than a second preset value, causing the erosion head to move the electrode either to:
  (a) further machining said electrode by said machining tool, or
  (b) placing said electrode in said magazine and thereafter removing said electrode from said magazine with said clamping device, moving said electrode to said machining tool, and further machining said electrode by said machining tool while held by said clamping device; and
(M) if the differences between the preselected and the actual values measured during the above noted measurement of said workpiece blank exceed the second mentioned predetermined value, removing the electrode from the erosion head.

* * * * *